United States Patent [19]
Bolz et al.

[11] Patent Number: 5,810,060
[45] Date of Patent: Sep. 22, 1998

[54] FILLING INSTALLATION FOR HAZARDOUS POURABLE OR FLUID SUBSTANCES

[75] Inventors: Volker Bolz; Jürgen Bolz, both of Wangen, Germany

[73] Assignee: Helpman Verfahrenstechnik GmbH, Wangen, Germany

[21] Appl. No.: 750,008

[22] PCT Filed: Jun. 2, 1995

[86] PCT No.: PCT/EP95/02103

§ 371 Date: Nov. 27, 1996

§ 102(e) Date: Nov. 27, 1996

[87] PCT Pub. No.: WO95/33650

PCT Pub. Date: Dec. 14, 1995

[30] Foreign Application Priority Data

Jun. 2, 1994 [DE] Germany .................. 44 19 333.5

[51] Int. Cl.⁶ .................................................. B65B 31/02
[52] U.S. Cl. .............................. 141/97; 141/65; 141/93; 141/287; 141/313
[58] Field of Search ................... 141/5, 7, 47–49, 141/63–65, 67, 68, 93, 97, 287, 313, 314

[56] References Cited

U.S. PATENT DOCUMENTS

| 2,780,247 | 2/1957 | Claassen, Jr. ................ 141/7 |
| 4,872,493 | 10/1989 | Everman .................... 141/67 |
| 4,987,933 | 1/1991 | Mack ......................... 141/7 |
| 4,999,978 | 3/1991 | Kohlbach et al. ........... 141/49 |
| 5,316,056 | 5/1994 | Stott .......................... 141/68 |
| 5,322,095 | 6/1994 | Bolz .......................... 141/93 |

FOREIGN PATENT DOCUMENTS 521 252  1/1993  European Pat. Off. .

Primary Examiner—J. Casimer Jacyna
Attorney, Agent, or Firm—Baker & Maxham

[57] ABSTRACT

A filling installation for hazardous pourable or fluid substances. The substances to be packaged at the output of a production plant are divided into portions and packaged in a glove box of a sacking plant in clean room conditions. The sacking plant may be shut off from the glove box by a sealing swivelling cover. The glove box is held under an overpressure and a laminar flow of pure air is continuously present in the glove box and flows around at least one filling head arranged at the output of the production plant.

6 Claims, 9 Drawing Sheets

FILLING INSTALLATION FOR HAZARDOUS POURABLE OR FLUID SUBSTANCES

BACKGROUND OF THE INVENTION

1. Field of the Invention

This invention generally concerns a filling installation for hazardous substances, and more particularly relates to such an installation by which free-flowing materials are safely packaged.

2. Description of the Related Art

A filling installation of the subject type is known from European Patent 521,252 which is attributed to the same applicant. This known filling installation has a so-called dual-chamber system where a metering device opens into an upper glove box, which also has a lower orifice connected to a second chamber. In the area of this second chamber there is a bag that is to be filled and is pulled upward through the orifice from the lower chamber into the glove orifices of the glove box and then is attached to the filling head that opens into the upper chamber (glove box) and is sealed there.

This is a dual-chamber system intended for filling hazardous pourable or freeflowing substances without the operator coming in contact with the media. In addition, low pressure prevailing in the glove box and in the lower chamber assure that hazardous media cannot enter the environment outside the two boxes.

However, according to this known system, filling cannot be performed under clean room conditions. Clean room conditions here are understood to refer to the conditions stipulated by U.S. Federal Standard 209, namely, that a certain excess pressure should be maintained in the chamber and a certain maximum foreign particle count must not be exceeded in this chamber, so most of the air in this chamber is clean room air in which the foreign particle count is strictly limited.

European Patent 96,336 discloses a filling system with a closed chamber that is kept under clean room conditions, where this clean room has laminar air flow that assures the clean air conditions. A particular disadvantage of this known device is that the possibility of particles of the substance being packaged escaping during the filling operation cannot be ruled out due to the design of the filling system, and thus there is the risk of contamination of the operating personnel.

In the past it was known only that such filling systems could be set up in clean air rooms, which were small rooms where the operating person was also present to perform the operation of transferring such materials under these conditions. However, this has the disadvantage that the presence of the operating person in the clean room itself presents a high risk of contamination because foreign particles are usually introduced by the operating personnel.

SUMMARY OF THE INVENTION

A primary purpose of this invention is therefore to improve on a filling system of the type described initially so that pourable or free-flowing materials, that are or may be hazardous, can be packaged under clean room conditions.

An important feature of this invention is that the filling head is mounted inside the glove box and a laminar flow of clean air is provided in the glove box so that it flows at least around the filling head, and an excess pressure prevails in this glove box.

Thus, the present technical teaching yields the important advantage that clean air conditions are created in a very limited space, namely, only where clean air conditions are needed, because the operating person is now outside the glove box and reaches into the glove box only through appropriate hermetically sealed operating orifices. In any case, this prevents contamination of the interior of the glove box, and clean air conditions around the filling head are assured.

This makes it possible for the first time to transfer materials that are pourable or free-flowing (and are or may be hazardous) under relatively inexpensive conditions, where a sealable orifice is provided beneath the glove box so the material to be filled is transferred through this sealable orifice into a bag or a container under clean air conditions.

It is essential here for this orifice to remain sealed at all times as long as the bag or container to be filled is not yet attached and sealed to the filling head. Only when an absolutely airtight connection of the bag or container to be filled and the filling head is achieved is the glove box opened in the area of the lower orifice, and the bag or container is filled while the glove box is open, while the laminar flow described above is maintained in the glove box.

In a preferred embodiment of the present invention, laminar flow is created in the glove box by providing a series of several filters in succession, such that each filter is just large enough to fill out the cross section of the glove box, so that a uniform laminar flow is created over the entire length of the glove box, preferably directed horizontally and such that it flows around the filling head.

Such a filter arrangement may preferably consist of a main filter downstream from a preliminary filter. On the opposite, long side of the glove box there is an exhaust air filter through which the laminar flow is vented so that it is directed back to the injection point of the glove box in an air circulation process. It is possible here to add fresh air to the circulating air, where the amount of fresh air added is adjusted to the prevailing needs.

Instead of horizontal laminar air flow in the glove box as described above, another embodiment of this invention provides for the filters to be mounted vertically so that a vertical laminar air flow is created in the glove box, but it is essential here for this flow to also surround the filling head in a laminar flow.

The present invention also concerns another object of the invention, namely a specific design of a filling head.

In the state of the art, an operator had to manually reach into the glove box to guide the bag to the filling head mounted in the glove box and secure it there in order to permit filling of the bag at all. It was impossible to fill stationary containers, drums, etc. It is known that such stationary containers can be filled by the so-called double-door principle, which means that there is a first seal on the filling head, and the container to be filled is provided with a second seal. The two seals would be linked together by an appropriate quick-release lock. They would then be removed and next, in order to fill the container, a filling tube would be inserted into the space formed between the filling head and the container. A disadvantage of this known filling technique was that the arrangement of such sealing covers in conjunction with quick-release locks was complicated and was not suitable for large-scale containers with a relatively large filling capacity.

Therefore another object of this invention is to improve on such a filling system so that a double-lock system can be implemented relatively inexpensively without requiring quick-release locks between the sealing covers to be connected.

An important feature of this technical teaching is that a telescoping tube that can be raised and lowered is mounted on the filling head and can be advanced onto a sealing cover in a chamber with a seal and can be connected to this sealing cover, where the sealing cover of the chamber and the sealing cover of the container to be filled can be connected to each other. This yields a novel process that takes place without any manual support.

Another important feature of this part of the invention is thus the vertically telescoping tube that surrounds the filling head radially and is designed so it can be raised and lowered with respect to the stationary filling head.

BRIEF DESCRIPTION OF THE DRAWING

The objects, advantages and features of this invention will be more readily perceived from the following detailed description, when read in conjunction with the accompanying drawing, in which.

DETAILED DESCRIPTION OF THE PREFERRED EMBODIMENTS

Figure 1:
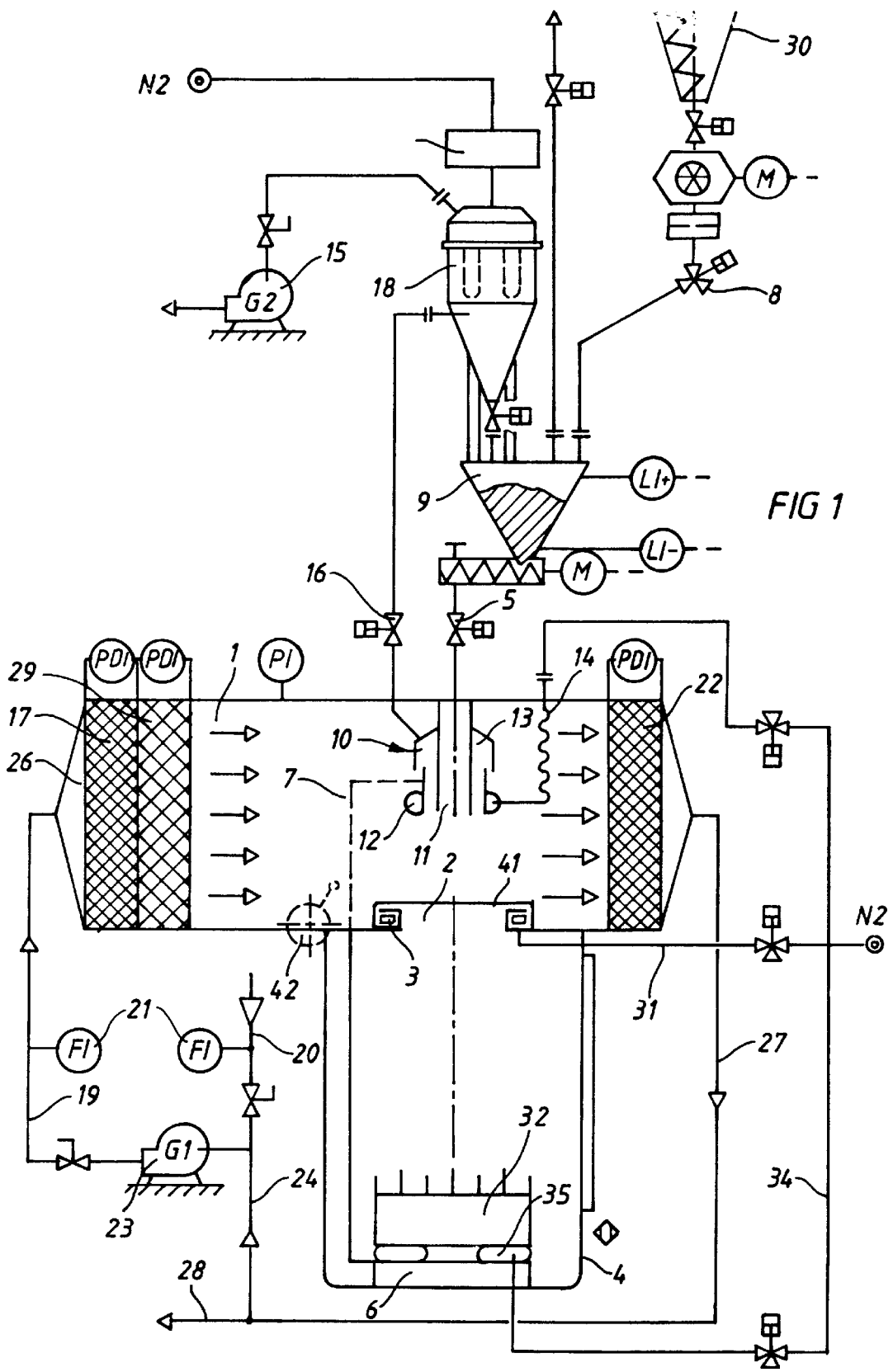
FIG. 1 is a diagram of a glove box configured according to this invention with clean air conditions in a first process state.
Figure 2:
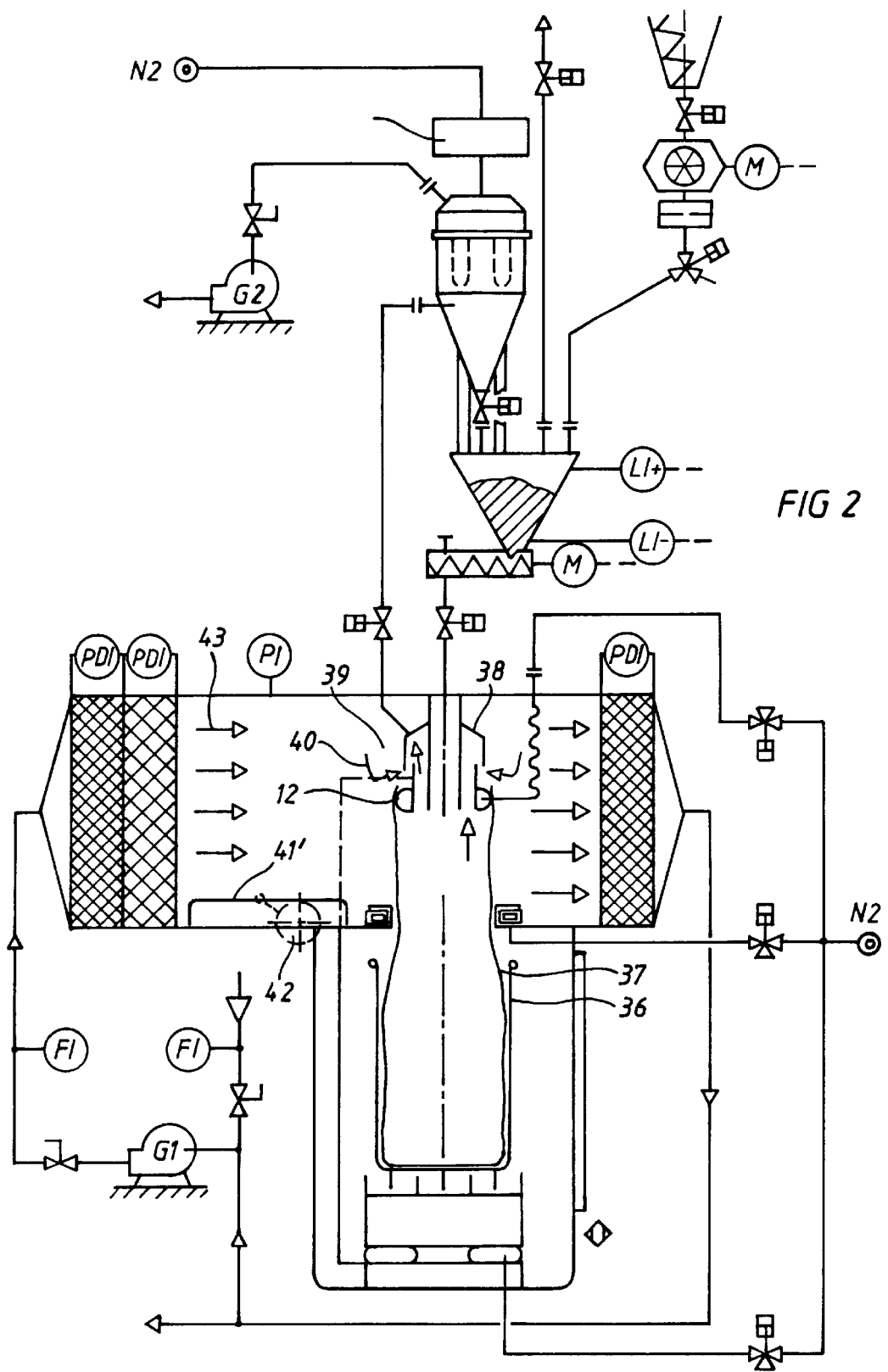
FIG. 2 shows the glove box of FIG. 1 in a second process state.
Figure 3:
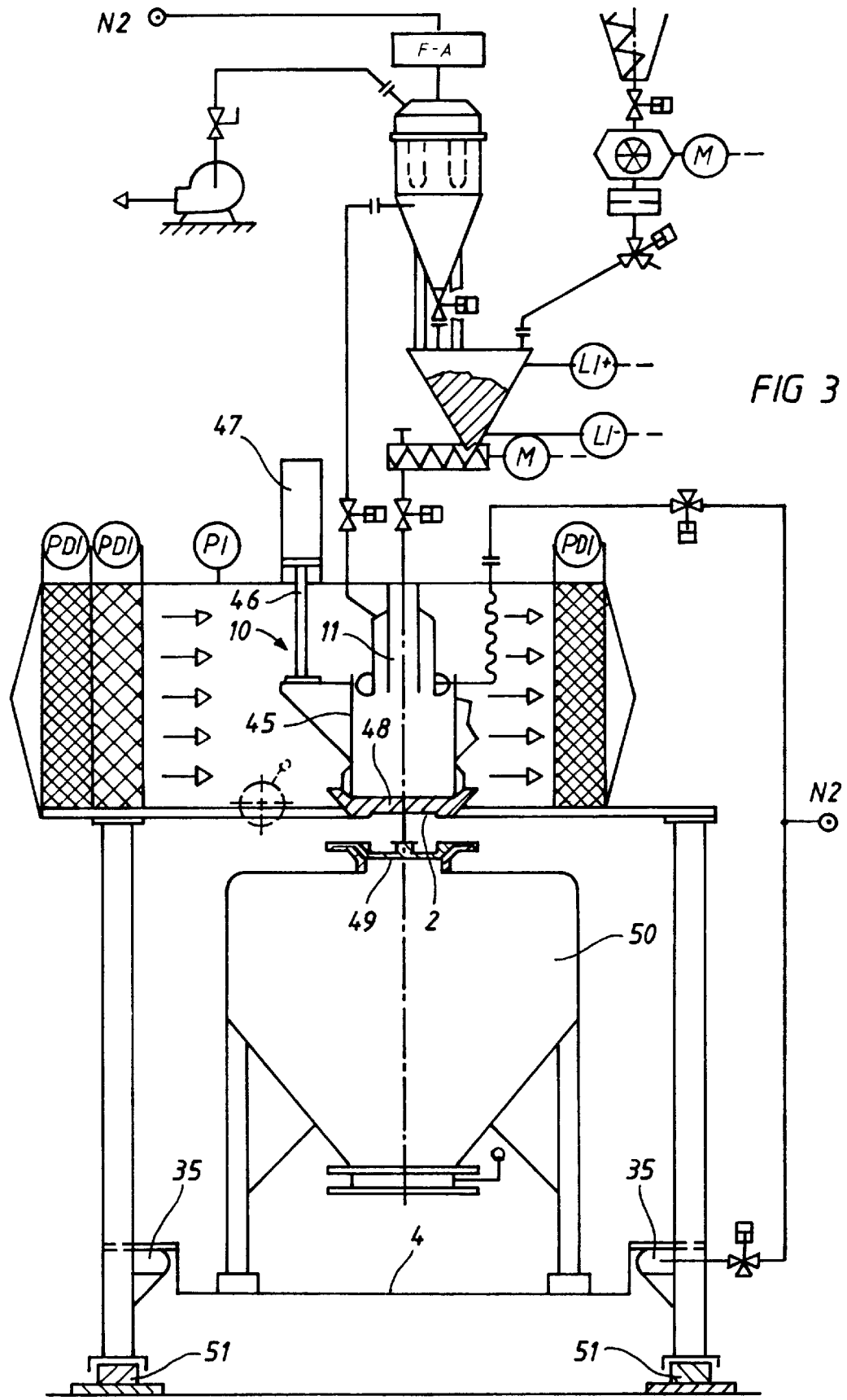
FIG. 3 is an arrangement of a new type of filling head in combination with a glove box according to FIGS. 1 and 2.

With reference now to the drawing, and more particularly to FIGS. 1 and 2, a new type of glove box 1 according to the invention is shown, where a laminar air flow is created in the direction of arrows 43, 44. An excess pressure is created in glove box 1 by sealing lower orifice 2 with swiveling cover 41 as shown in FIG. 1.

In the process step according to FIG. 1, scales 6 are provided at the lower side of orifice 2, and vibrator 32 is placed on the scales over hydraulic cushion 35. Swiveling cover 41 is connected to orifice 2 with a hermetic seal by means of sealing device 3. The air flow in the chamber is directed by having line or conduit 19 open into injection space 26 of glove box 1 so that clean air taken from line 24 or 27 can be injected through line 19 by fan 23. In a branch of line 24, fresh air 20 can be supplied as a substream to fan 23, where the air streams injected into glove box 1 are measured by appropriate volume flow meters 21.

Preliminary filter 17 is mounted in injection space 26 with main filter 29 connected downstream from it. Since the two filters 17 and 29 fill up the entire cross section of the chamber, this creates a laminar air flow in the direction of arrows 43 (FIG. 2), so it flows around filling head 10 which projects into the chamber. Filters 17 and 29 (as well as an exhaust air filter 22) are provided with measurement devices for determining the pressure drop at the filter so the proper interval for replacement of the filters can be ascertained.

Filling head 10 consists essentially of internal filling tube 11 that is surrounded radially in the upper part by exhaust head 38 (FIG. 2). Exhaust connection 13 opens into this exhaust head 38, so a stream of air from this connection is exhausted through line 16 and is sent to main filter 18 that is connected to fan 15. The stream of material created by the filling operation in exhaust head 38 is separated in main filter 18 and sent back to metering device 9.

Outlet valve 8 leads from the outlet of mixer 30 which contains the substance to be transferred to metering device 9 where the substance is sent to fast-acting slide valve 5 via a metering screw.

Inflatable gasket 12 is provided on the outer circumference of filling tube 11 in the area of another tube. This inflatable gasket is supplied with a pressurized medium from line 14.

As explained initially, the air in the glove box is guided in a laminar flow in the horizontal direction as shown by arrows 43, 44, while the air stream is circulated during operation and a certain stream of exhaust air can be removed through line 28. A pressurized medium is supplied to the sealing device 3 through line 31.

FIG. 2 shows a more advanced stage of the filling operation, where it can be seen that drum 36 has been placed on vibrator 32 and holds bag 37 whose top part has been manually pulled upward into the orifices (not shown) of glove box 1 so the top edges of bag 37 are connected to gasket 12 that receives the pressurized medium to form a seal. In this position, bag 37 is filled under clean air conditions, where filling head 10 is constantly surrounded by laminar flow in the direction of arrows 43, 44. At the same time, air flows through exhaust head 38, where clean air from glove box 1 is sent out of the clean air room into exhaust head 38 through orifices 39 in the direction of arrow 40 and the resulting exhaust air is sent to main filter 18 through line 16.

Meanwhile drum 36 is brought up and sealed to the lower side of orifice 2 by putting hydraulic cushions 35 under pressure through line 34. To fill the bag, orifice 2 is first exposed by moving swivel cover 41 into position 41' with the help of lever 42.

Figure 8:
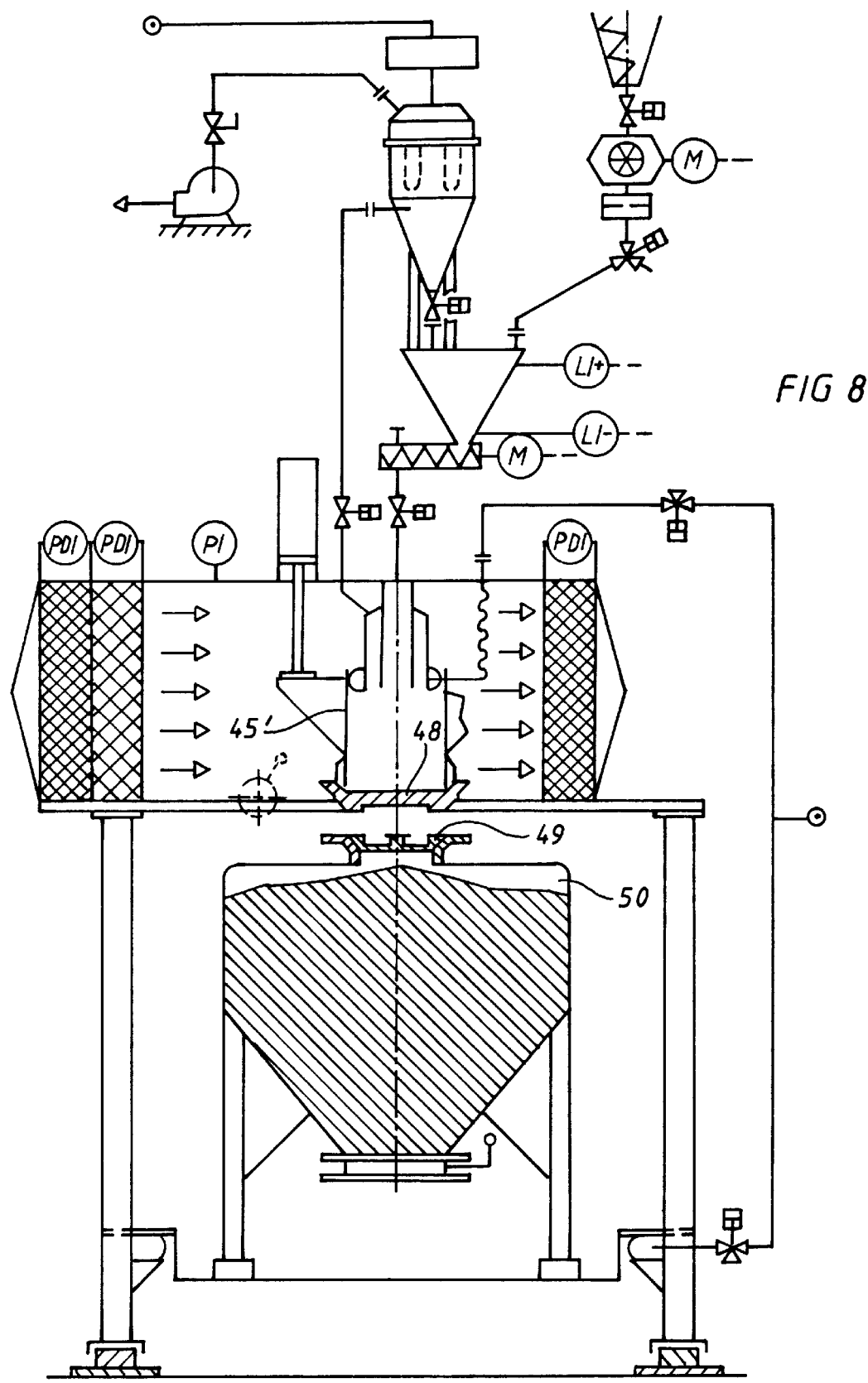
FIG. 8 shows a sixth process step.
Figure 9:
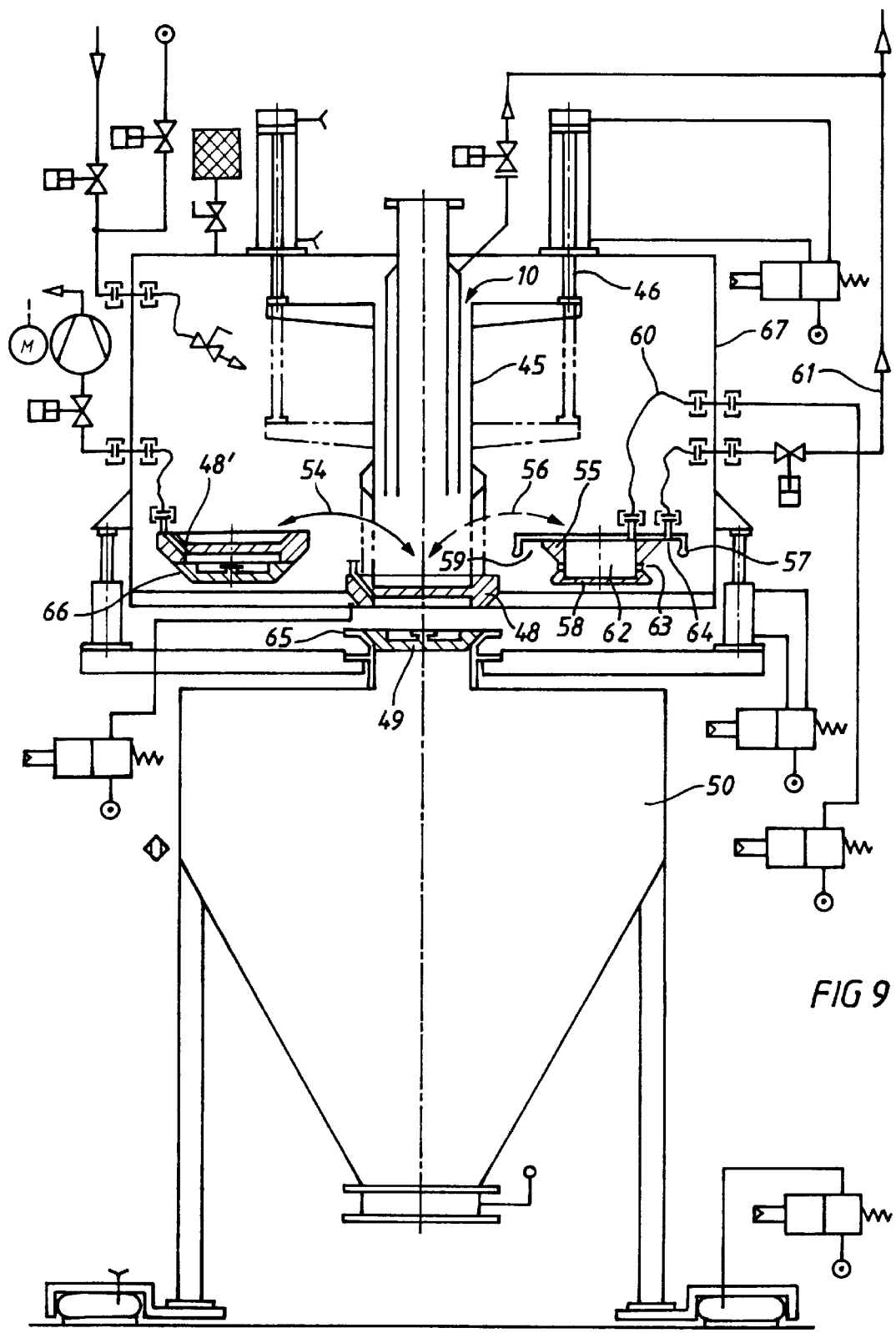
FIG. 9 depicts a modified embodiment in comparison with FIGS. 3–8, where the glove box is replaced by a chamber.

On the basis of FIGS. 3–9, a new type of filling system is now presented, concerning a new type of filling head 10, where it can be seen here that this filling system can be used with glove box 1 according to FIGS. 1 and 2 (cf. FIGS. 3–8) or glove box 1 may be omitted and instead just airtight chamber 67 may be provided (cf. FIG. 9). Otherwise, the same explanations apply to the same parts as in FIGS. 1 and 2. For the sake of simplicity, these parts are not labeled in FIGS. 3 to 9 because the explanations given above also apply here.

If stationary container 50 is to be filled from glove box 1 or from chamber 67, it is impossible to initiate the proper filling operations by reaching into orifices of a glove box or a chamber because there is no bag to be lifted and manipulated. Therefore, a double-door locking arrangement must be created, where container 50 can be filled without manual intervention, as described below. The term "manual assistance" here is understood to refer to manipulation of the bag to be filled, which is impossible with a stationary container or drum.

According to this invention, telescoping tube 45, configured to be raised and lowered, is mounted on the outside circumference of filling head 10 and is raised and lowered by means of piston-cylinder arrangement 46, 47. According to FIG. 3, two piston rods 46 act on the outside circumference of telescoping tube 45. These piston rods 46 are mounted on the respective cylinders 47 so they can be raised and lowered.

Orifice 2 of glove box 1 is closed by an upper sealing cover 48 that is operated by telescoping tube 45 according to this invention. Telescoping tube 45 is shown here in the lowered position, and it holds sealing cover 48 in its closed position. No mechanical coupling is necessary here.

Container 50 that is to be filled is held in frame 4 that is also designed to be raised and lowered on hydraulic cushions 35. Glove box 1 rests on weighing cells 51 over its own frame. Instead of the arrangement of weighing cells 51, a volumetric determination of the material transferred to container 50 is also possible, in which case weighing cells 51 are eliminated. In the position shown in FIG. 3, container 50 is sealed with a lower sealing cover 49.

Figure 4:
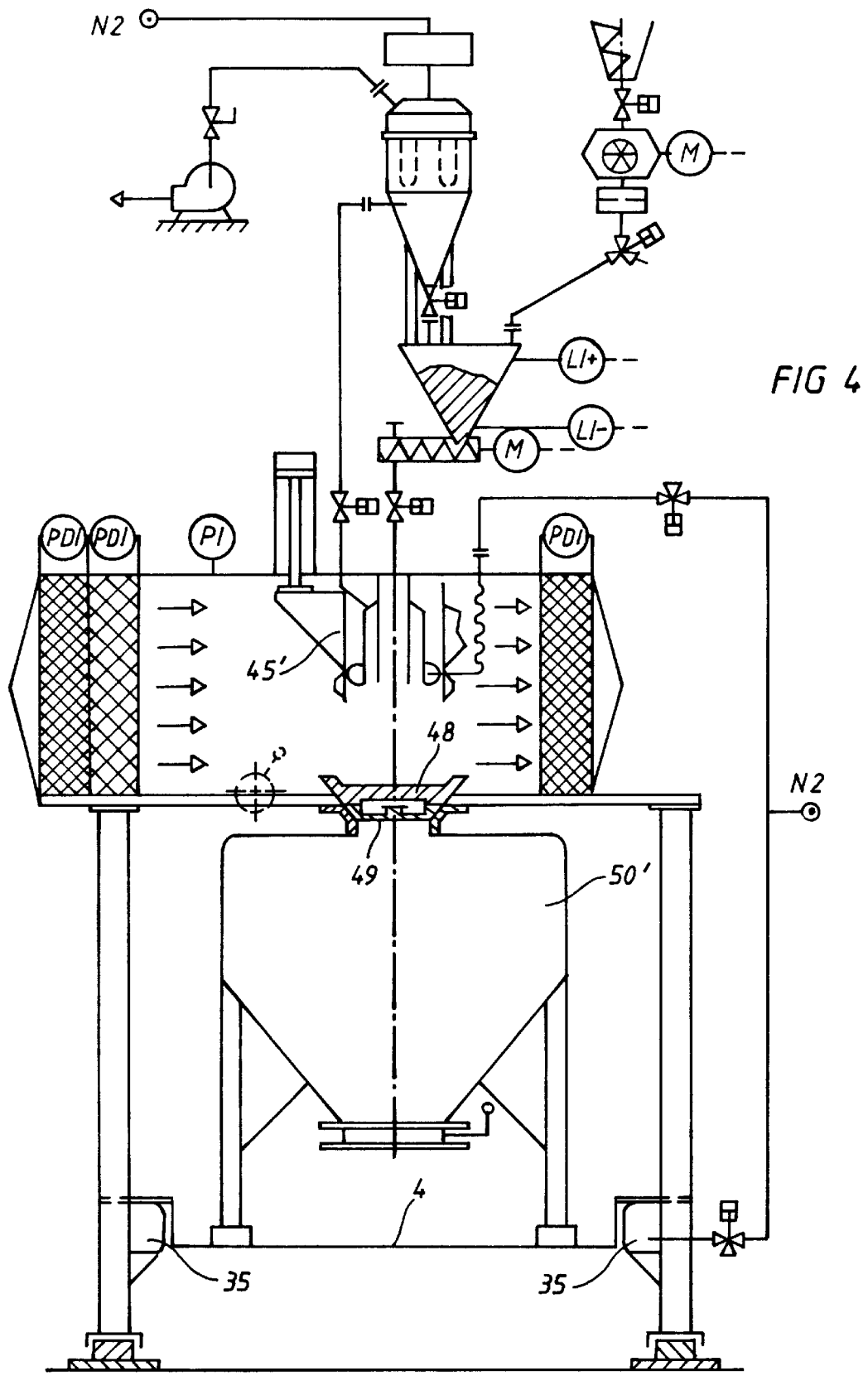
FIG. 4 shows a second process step in comparison with FIG. 3.

To fill container 50, hydraulic cushions 35 are controlled according to FIG. 4 and the container is raised upward into its position 50', where the two sealing covers 48 and 49 come in contact. A vacuum is then created in the space between sealing covers 48 and 49 to apply suction to these two covers and link them together. Instead of the vacuum coupling, mechanical or magnetic couplings are also possible.

Figure 5:
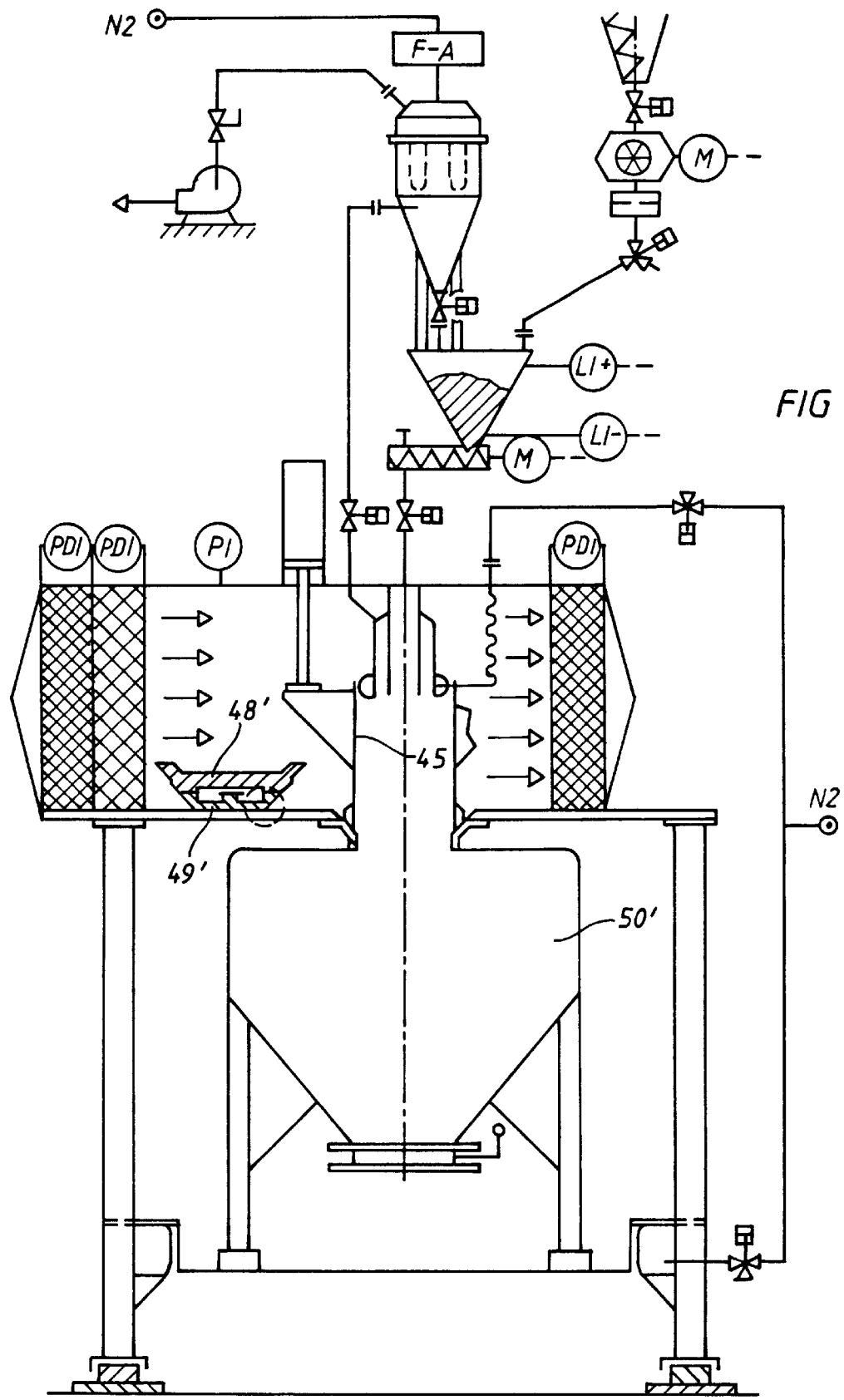
FIG. 5 depicts a third process step.
Figure 6:
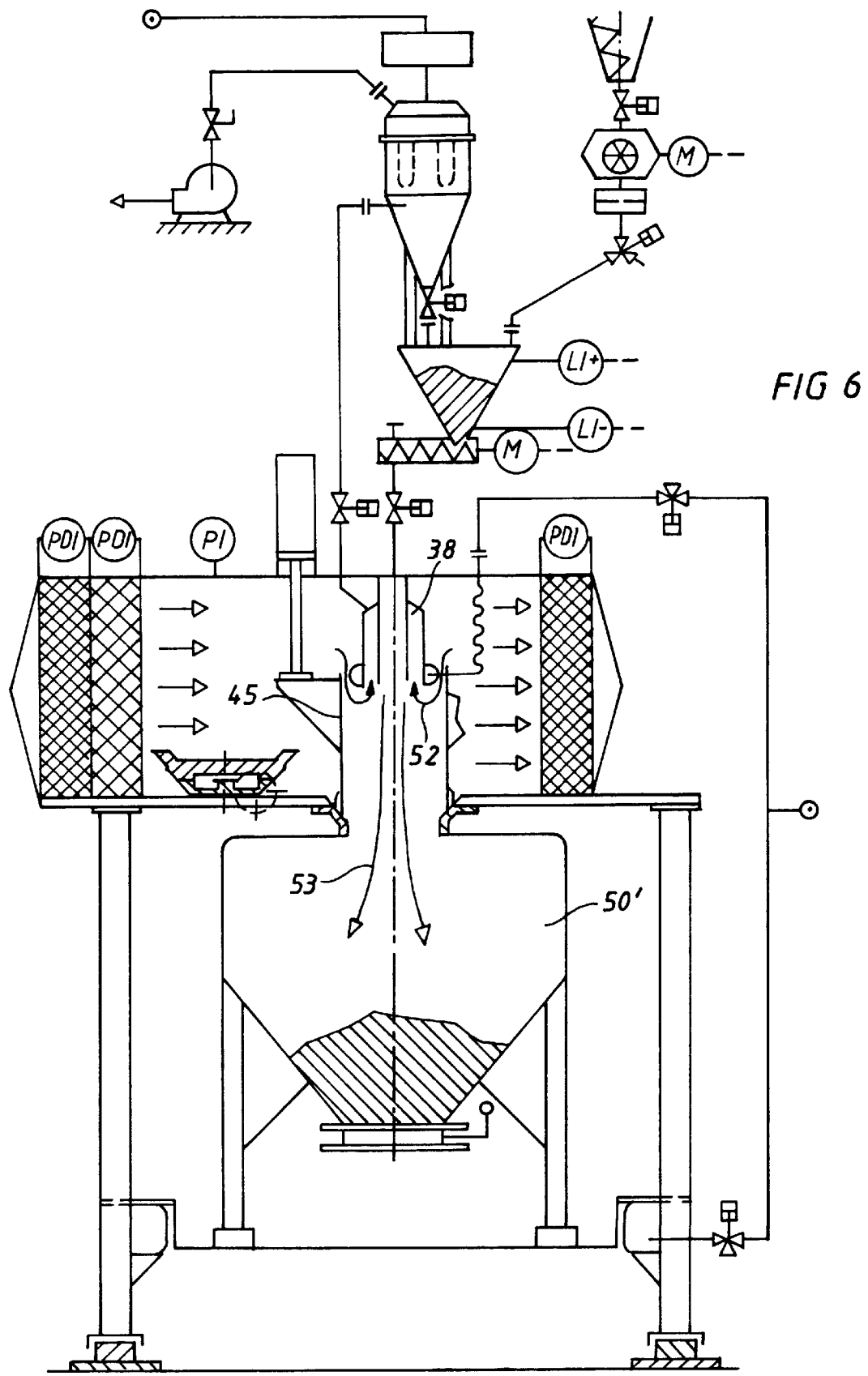
FIG. 6 shows a fourth process step.
Figure 7:
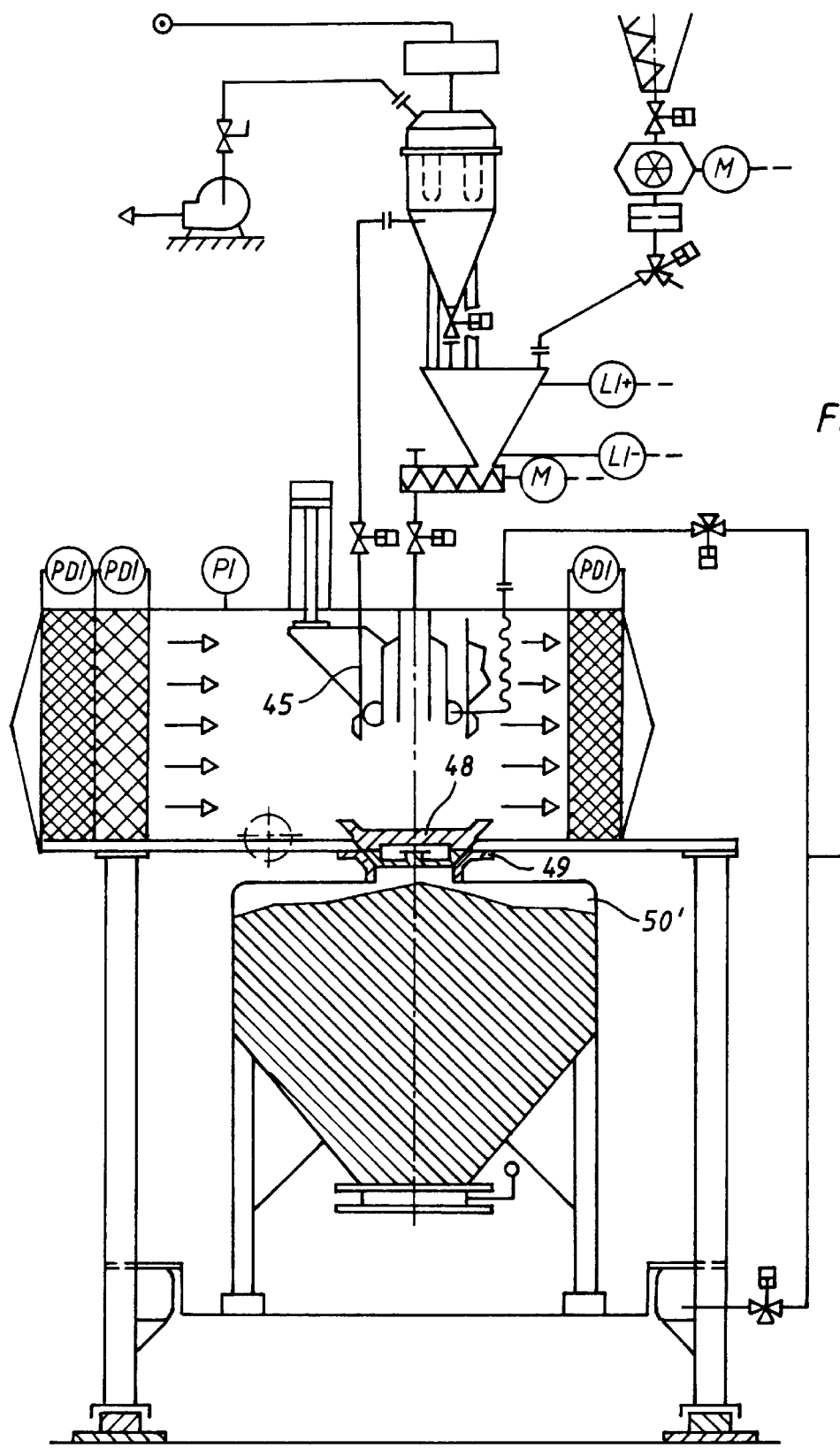
FIG. 7 shows a fifth process step.

According to FIG. 5, covers 48, 49 that are linked together are moved into their positions 48', 49', namely laterally from orifice 2, where a mechanically operated slide system or a pneumatically operated or electric motor-driven slide system can be used. Telescoping tube 45 is then lowered again in comparison with FIG. 4, so its radially and outside positioned ring gasket provides a seal against the respective gasket on the top side of container 50', but a seal is not necessary on orifice 2 per se. Then the material to be packaged is introduced into container 50', and exhaust head 38 mounted on filling head 10 is rinsed with clean air in the direction of arrows 52 and at the same time the material flows into container 50' as product stream 53 (FIG. 6).

After completely filling container 50', covers 48, 49 that have been joined together are returned to their locked positions on orifice 2 (FIG. 4), and the vacuum between the two covers is broken so they can be separated. The separation is illustrated in FIG. 8, where telescoping tube 45 has been returned to its lowered position (45') and holds upper sealing cover 48 on orifice 2 so the latter is sealed. At the same time, lower sealing cover 49 has been placed on container 50 and locked onto it with a seal.

FIG. 9 shows that instead of the arrangement of glove box 1 with a corresponding clean air atmosphere, a simple hermetically sealed chamber 67 can also be used. Again in this chamber, filling head 10 is provided in a telescoping tube 45 and the process steps are the same as those illustrated in FIGS. 3–8.

It can be seen here that the upper sealing cover 48 can be moved into position 48', and as an additional feature there is also a cleaning cover 55 that can be moved in the direction of arrow 56 into a position at the side of orifice 2 and also into a position that seals orifice 2.

Cleaning cover 55 serves to clean the edge of orifice 2 in chamber 67 and can also be used for cleaning orifice 2 in glove box 1. Cleaning cover 55 is positioned with external gasket 57 on the edge around orifice 2, where a lower gasket 58 rests on the edge of the orifice of the connection of container 50.

A cleaning medium, preferably a gas, is then introduced through line 60 into the interior 62 of cleaning cover 55, where the gas flows through the tangential orifices 63 into cleaning space 59 which is an annular space provided on the inside radially of the peripheral edge of orifice 2. A tangential vortex is created in this cleaning space 59 and thus removes all soiling on the edge of orifice 2 and on the container connection of container 50. This soiling is then discharged to the outside through orifices 64 and line 61.

It should also be pointed out that sealing cover 48 has cover gaskets 66 on the outside radially while sealing cover 49 on container 50 has connection gaskets 65 on the outside radially. These gaskets create a seal when engaged in the condition illustrated in FIG. 7, for example.

In view of the above description it is likely that modifications and improvements will occur to those skilled in this technical field which are within the scope of the invention. Accordingly, this invention is to be limited only by the spirit and scope of the appended claims and equivalents thereto.

What is claimed is:

1. A filling installation for transferring and packaging pourable or free-flowing hazardous materials from the outlet of a production plant, said installation comprising:

a glove box having an inlet and an outlet;

a filling head mounted at said inlet of said glove box;

a filling tube in said filling head coupled to said glove box inlet and adapted to be coupled to said production plant outlet;

a telescoping tube in said glove box that can be raised and lowered and in its raised position surrounds said filling head;

a double-door sealing device comprising an upper sealing cover to seal said outlet of said glove box and a lower sealing cover to seal the inlet of a container to be filled;

whereby said upper and lower sealing covers are adapted to be connected to each other, and when said telescoping tube is in its lower position it connects with said upper cover;

container filling apparatus coupled to said glove box outlet, said container filling apparatus being adapted to connect and seal the container to said glove box outlet for packaging pourable materials;

a swivel cover on said glove box outlet to selectively seal said glove box outlet;

several successive filters provided over the entire cross-section of said glove box for maintaining an excess pressure and a generally laminar flow of clean air in said glove box, wherein said several filters comprise a main filter with a preliminary filter upstream from said main filter, both being provided at the clean air inlet side of said glove box, and an exhaust air filter is provided at the outlet for the clean air from said glove box, said laminar flow of air flowing at least around said filling head; and exhaust means radially encompassing said filling tube.

2. The filling installation according to claim 1, wherein said filling head is closed as long as the container to be filled is not sealed on said filling head.

3. A filling installation for transferring and packaging pourable or free-flowing hazardous materials from the outlet of a production plant, said installation comprising:

a glove box having an inlet and an outlet;

a filling head mounted at said inlet of said glove box;

a filling tube in said filling head coupled to said glove box inlet and adapted to be coupled to said production plant outlet;

a telescoping tube in said glove box that can be raised and lowered and in its raised position surrounds said filling head;

a piston-cylinder arrangement coupled to said telescoping tube for effecting raising and lowering said tube;

a double-door sealing device comprising an upper sealing cover to seal said outlet of said glove box and a lower sealing cover to seal the inlet of a container to be filled;

whereby said upper and lower sealing covers are adapted to be connected to each other, and when said telescoping tube is in its lower position it connects with said upper cover;

container filling apparatus coupled to said glove box outlet, said container filling apparatus being adapted to connect and seal the container to said glove box outlet for packaging pourable materials;

a swivel cover on said glove box outlet to selectively seal said glove box outlet;

means for maintaining an excess pressure and a generally laminar flow of clean air in said glove box, said laminar flow of clean air flowing at least around said filling head; and exhaust means radially encompassing said filling tube.

4. The filling installation according to claim 3, wherein said filling head is closed as long as the container to be filled is not sealed on said filling head.

5. A filling installation for transferring and packaging pourable or free-flowing hazardous materials from the outlet of a production plant, said installation comprising:

a glove box having injection space an inlet and an outlet;

a filling head mounted at said inlet of said glove box;

a metering device through which the materials flow to said filling head;

a filling tube in said filling head coupled to said glove box inlet and adapted to be coupled to said production plant outlet;

a telescope tube in said glove box that can be raised and lowered and in its raised position surrounds said filling head;

a double-door sealing device comprising an upper sealing cover to seal said outlet of said glove box and a lower sealing cover to deal the inlet of a container to be filled;

hydraulic cushions arranged below said upper sealing cover;

whereby said upper and lower sealing covers are adapted to be connected to each other, and when said telescoping tube is in its lower position it connects with said upper cover;

container filling apparatus coupled to said glove box outlet, said container filling apparatus being adapted to connect and seal the container to said glove box outlet for packaging the pourable materials:

a swivel cover on said glove box outlet to selectively seal said glove box outlet;

means including fans, conduits and inlet and exhaust filters for maintaining an excess pressure and a generally laminar flow of clean air in said glove box, said laminar flow of clean air flowing at least around said filling head; and exhaust means radially encompassing said filling tube, said exhaust means comprising an exhaust head having an exhaust connection, a main filter and an exhaust fan;

said filling installation when operating to fill a container, functioning so that;

in the starting position, the upper sealing cover being closed and the telescoping tube resting on the upper sealing cover and keeping it sealed;

the container to be filled being arranged on the hydraulic cushions below the upper sealing cover in such a way that the lower sealing cover is below the upper sealing cover and the telescoping tube is raised;

the hydraulic cushion being inflated and the lower sealing cover and the upper sealing cover are brought in contact and linked together;

the double-door sealing device being moved away from the orifice of the glove box;

the telescoping tube being lowered onto the container to be filled so it seals it;

the filling head being opened to fill the container;

after filling the container, the filling head being closed, the telescoping tube beings raised, the double-door sealing device being advanced to the orifice of the glove box, the double-door sealing device is uncoupled and the telescoping tube is lowered onto the upper sealing cover, in the starting position; and the laminar flow of clean air being produced by a fan, then passing through a said conduit into the injection space of the glove box and being introduced into the glove box through said inlet filters constantly flowing at least around the filling head during the entire operation of the device and being sent back to a said fan after passing through the exhaust air filter and conduits or leaving the device as exhaust air through conduits, the internal filling tube of the filling head being surrounded radially in its upper part by the exhaust means consisting of said exhaust head having said exhaust connection opening into it with a said conduit connected to it and the main filter in line and with said exhaust fan, and during the entire filling operation, the material to be filled that enters the exhaust head being separated in the main filter and returned to the metering device.

6. The filling installation according to claim 5, wherein said filling head is closed as long as the container to be filled is not sealed on said filling head.

* * * * *